(12) United States Patent
Jensen et al.

(10) Patent No.: US 8,627,737 B2
(45) Date of Patent: Jan. 14, 2014

(54) SPUR GEAR FINAL DRIVE WITH INTEGRATED BRAKES

(75) Inventors: Jeffrey Edward Jensen, Dunlap, IL (US); Brian Howson, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 303 days.

(21) Appl. No.: 13/049,523

(22) Filed: Mar. 16, 2011

(65) Prior Publication Data

US 2012/0234121 A1  Sep. 20, 2012

(51) Int. Cl.
*F16H 57/10* (2006.01)
*F16H 1/12* (2006.01)
*F16H 1/20* (2006.01)

(52) U.S. Cl.
USPC .................................... 74/411.5; 74/421 R

(58) Field of Classification Search
USPC ............ 74/411.5, 412 R, 413, 414, 460, 462, 74/650; 192/221, 221.1, 225
See application file for complete search history.

(56) References Cited

U.S. PATENT DOCUMENTS

| | | | |
|---|---|---|---|
| 1,316,057 A | 9/1919 | Parker | |
| 1,674,200 A * | 6/1928 | Gatten | 74/421 R |
| 2,893,268 A | 7/1959 | Liebel | |
| 2,970,491 A * | 2/1961 | Bertsch | 476/70 |
| 3,095,762 A | 7/1963 | Baker | |
| 3,301,359 A | 1/1967 | Cole et al. | |
| 3,496,792 A * | 2/1970 | Ames | 74/411.5 |
| 3,686,978 A | 8/1972 | Knoblach et al. | |
| 3,754,625 A | 8/1973 | Voth et al. | |
| 3,800,901 A * | 4/1974 | Blomstrom et al. | 180/9.62 |
| 4,037,694 A | 7/1977 | Keese | |
| 4,145,613 A * | 3/1979 | Bunch | 378/26 |
| 4,431,073 A | 2/1984 | Nagao et al. | |
| 4,540,073 A | 9/1985 | Rogier | |
| 4,661,086 A | 4/1987 | Railsback | |
| 5,086,659 A * | 2/1992 | Earp | 74/411.5 |
| 5,147,255 A | 9/1992 | Strehler et al. | |
| 5,960,671 A * | 10/1999 | Nguyen | 74/397 |
| 6,318,200 B1 * | 11/2001 | Coleman et al. | 74/421 R |
| 6,354,421 B1 * | 3/2002 | Mochizuki et al. | 192/218 |
| 6,817,963 B1 | 11/2004 | Solka | |
| 6,866,605 B2 * | 3/2005 | Fabry | 475/20 |
| 2009/0308709 A1 * | 12/2009 | Haupt | 192/221 |

FOREIGN PATENT DOCUMENTS

JP  62-113944  5/1987

* cited by examiner

*Primary Examiner* — David M Fenstermacher
*Assistant Examiner* — Jake Cook
(74) *Attorney, Agent, or Firm* — Miller, Matthias & Hull

(57) ABSTRACT

A final drive gearbox is described. The final drive gearbox is a double reduction gearbox for off-road machines, which, unlike currently available double reduction gearboxes, contains no planetary gear sets. The final drive gearbox contains spur gears having pockets adapted to contain brake disc packs. The pockets may permit utilization of a plurality of brake packs within the gearbox without requiring additional space or enlargement of the gearbox housing. Use of spur gears may thus enable use of fewer gear parts, while use of multiple brake packs may enhance final drive brake capacity, improve longevity of the brake packs, and lengthen brake servicing cycles.

14 Claims, 2 Drawing Sheets

US 8,627,737 B2

SPUR GEAR FINAL DRIVE WITH INTEGRATED BRAKES

TECHNICAL FIELD

The present disclosure generally relates to final drives and, more particularly, relates to integrated brakes incorporated within gearboxes of final drives.

BACKGROUND

Final drives are utilized in a variety of motorized machines, including automobiles, buses and trucks, as well as off-road machines including those involved in construction, mining, and agriculture. The final drives of many off-road machines incorporate gear ratio reductions between their input and output shafts. Such gear reductions have been commonly achieved by either planetary gear sets or a combination of spur and planetary gear sets. One type involving the combination is described in U.S. Pat. No. 5,147,255 granted to Strehler et al., which is incorporated by reference herein.

Strehler et al. features a double reduction gearbox that incorporates a wet brake system sandwiched between respective spur and planetary gear sets to minimize physical space requirements for brakes of an industrial truck. According to Strehler et al., prior to Strehler et al. brakes were physically contained within structures situated only outside of the drive axle gearbox. As such, Strehler et al. introduces the placement of a wet brake inside of a drive axle gearbox.

Disadvantages of Strehler et al. include spatial limitations with respect to the amount of braking surface that can be contained within the Strehler gearbox, as well as limitations on potential physical locations of actual brake structures within Strehler's gearbox. Ideally, a gearbox could be manufactured that contained additional interior space for accommodating increased braking surface, albeit without commensurate requirement of employing a larger gearbox.

Finally, a major challenge associated with design and construction of gearboxes has been a continuing pressure to achieve more performance and functionality, while using fewer parts in smaller spaces with less weight. Among other things, this has translated into a quest for reducing numbers of gearbox parts, including actual numbers of gears employed, while squeezing additional structures, such as brakes and/or larger brake surfaces, into the gearbox housing envelope. As such, it would be desirable to be able to manufacture a double reduction gearbox possessing substantially fewer gears, while being able to offer greater braking capacity within the housings of gearboxes, albeit without increasing the size of the gearbox housing.

SUMMARY OF THE DISCLOSURE

In accordance with one aspect of the disclosure, a final drive gearbox includes an input gear and an output gear, and a reduction gear system interposed between the input and output gears. One gear of the reduction gear system and the output gear are spur gears, each including at least one concave pocket. The pockets may present opportunities to employ greater numbers of wet brake packs over those made available through use of conventional structures.

In accordance with another aspect of the disclosure, a final drive gearbox includes a plurality of spur gears, each gear defined by a plurality of such annular pockets, and the reduction gear system comprises a double reduction of gear ratios between the input and output gears.

In accordance with yet another aspect of the disclosure, a final drive gearbox is disclosed in which the reduction gear system comprises first and second reduction gears in mesh respectively with the input and output gears, and in which each of the gear reductions has a reduction ratio of, for example, 5:1.

DETAILED DESCRIPTION

Figure 1:
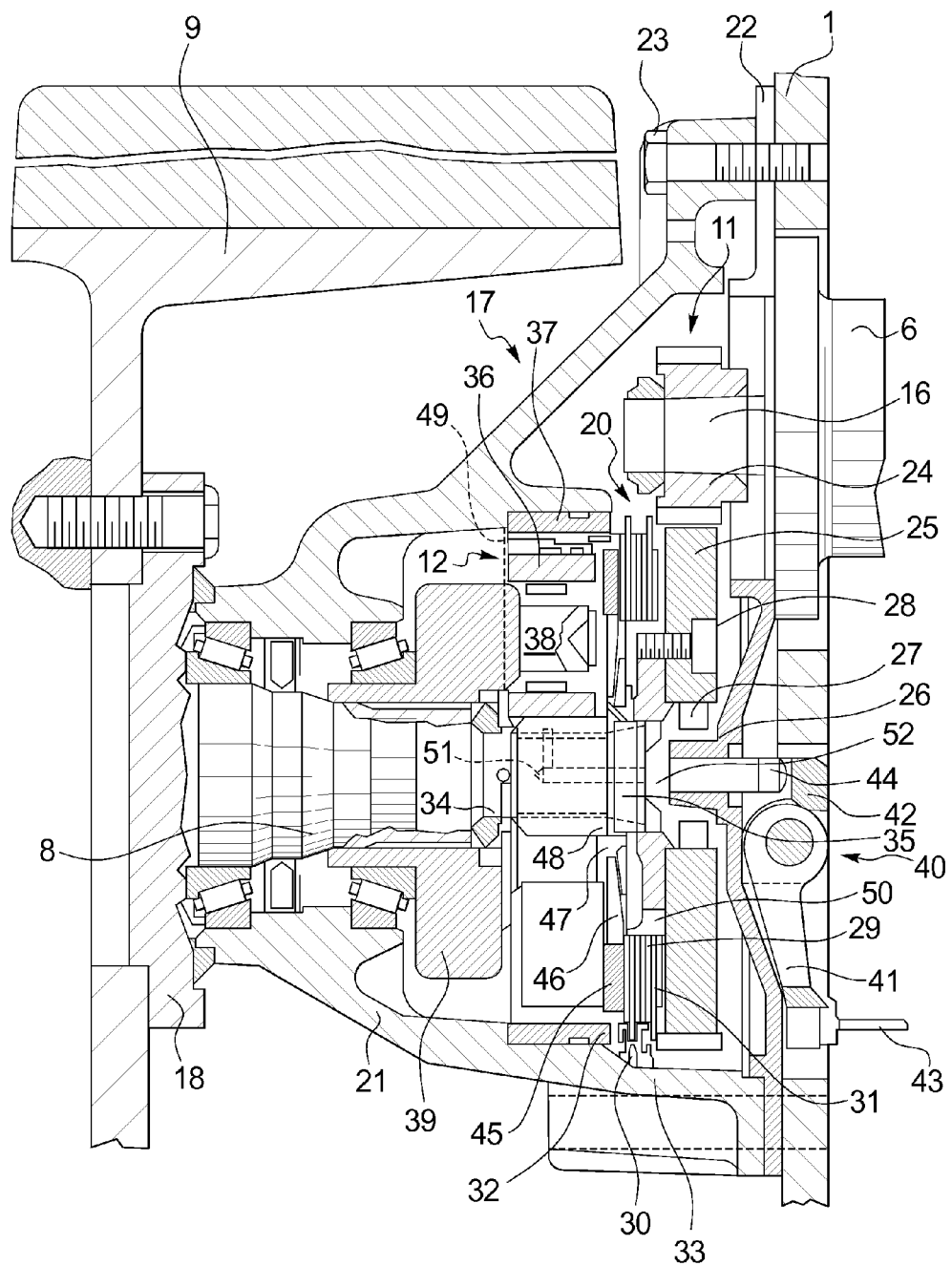
FIG. 1 is a side elevation cross-sectional view of a prior art double reduction final drive gearbox containing a set of wet brakes.

Referring initially to FIG. 1, a prior art final drive gearbox 17, also known in the art as a transmission, includes a transmission housing 21 adapted to receive and support an input shaft 16. A spur pinion gear 24 is fixed to the driving end of the input shaft 16, is in constant mesh therewith, and is adapted to drive a spur gear 25. The spur gear 25 is rotatably supported and axially movable on a cylindrical roller bearing 27. A wet brake 20 incorporates an annular first disc carrier 28 fastened to the spur gear 25, and supports a plurality of first braking discs 31. The discs 31 are so-called inner discs that are axially splined to the carrier 28 and rotatably movable therewith.

The inner discs 31 are axially movable on an external tooth system 29 of the first disc carrier 28. An annular second disc carrier 30 is positioned radially inwardly of the first disc carrier 28, and is fixed against movement relative to the transmission housing 21. The second disc carrier 30 supports a plurality of second braking discs 32, also variously referred to as outer discs. The outer discs 32 are splined to, and are thus axially movable on, an internal tooth system 33 of the second disc carrier 30.

As noted, the first disc carrier 28 is fastened to the spur gear 25; the spur gear terminates on the driven side thereof at, and is fixed to, a sun gear 34 of a planetary gear set 12. The sun gear 34 drives a set of planetary gears 36 that mesh with the internal teeth of a ring gear 37, the ring gear being fixed against rotation relative to the transmission housing 21. The planetary gears 36 are mounted on, and are rotatable with, a planetary carrier 39, which in turn is fixed to a wheel shaft 8. The shaft 8, rotatably supported by bearings, extends through an opening of the housing 21 and terminates in a wheel flange 18. The front drive wheel 9 of an associated industrial truck is attached to the wheel flange 18 by bolts shown but not referenced.

Finally, the brake 20, defined substantially by inner and outer braking discs 31, 32, is operated by a lever 40 connected to a cable line 43 as shown. Actuation of the cable line via the lever 40 urges a pressure pin 44 leftwardly against the sun gear 34 which, together with the first disc carrier 28 and spur gear 25, moves axially leftwardly, and in turn compresses the inner and outer braking discs 31, 32 together against an annular reaction bearing surface 45. Since the bearing surface is fixed against rotation relative to the housing 21, and thus with respect to the second disc carrier 30, the brake 20 is effective to slow and/or stop the drive wheel 9 of the truck.

Upon release of the brake 20 by the cable actuated lever 40, the pin 44 is urged axially rightwardly by a cup spring 46, effectively releasing the brake discs 31, 32, thereby canceling the braking action and permitting return of the spur gear 25 and the sun gear 34 into their respective initial positions.

Those skilled in the art will appreciate that the foregoing description represents current state-of-the-art with respect to dual stage or double reduction gearboxes, including all aforenoted limitations with respect to the numbers of gear parts employed, and to the opportunities for placement of wet brakes within interiors of gearbox or transmission housings.

Figure 2:
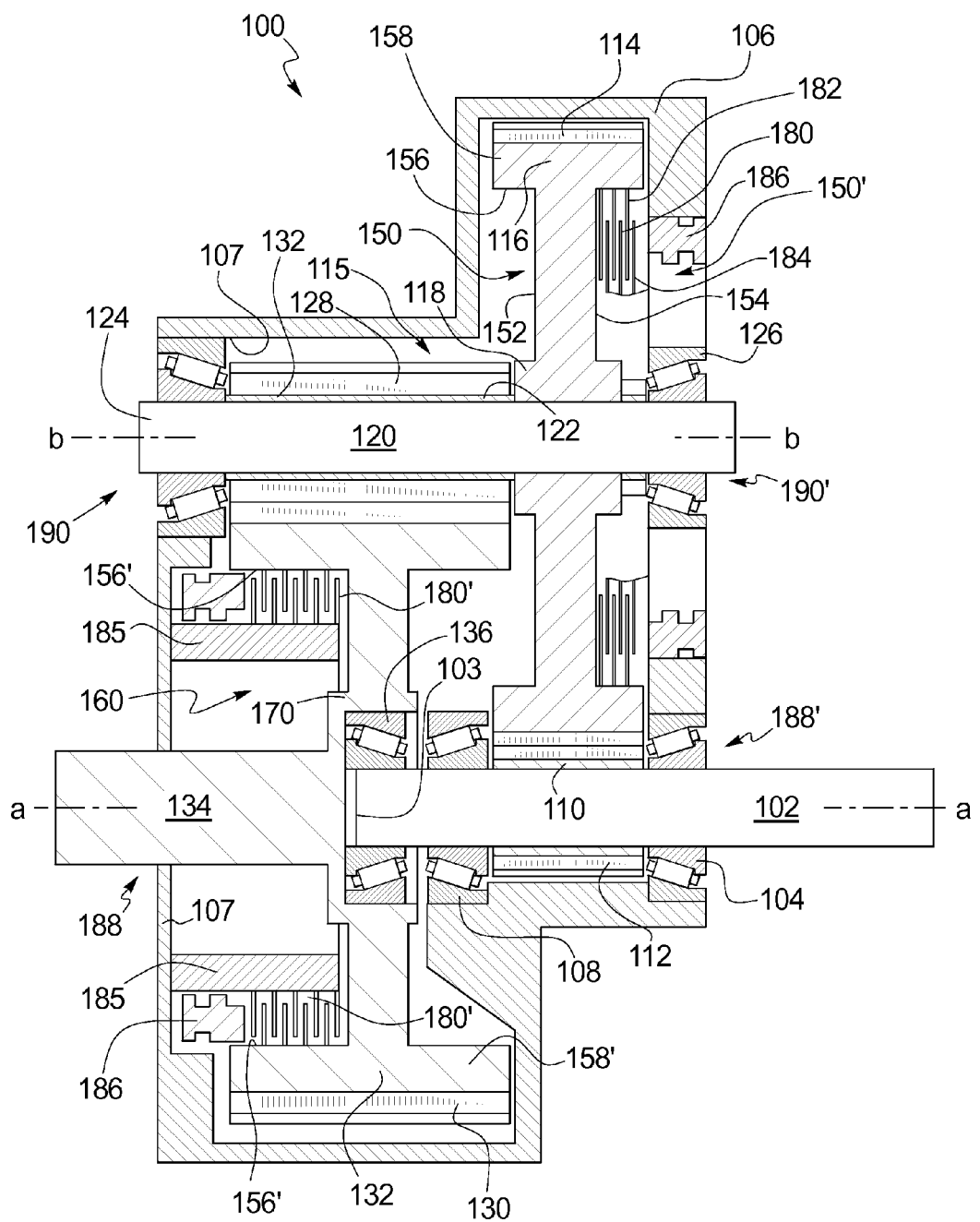
FIG. 2 is a side elevation cross-sectional view of one preferred embodiment of an improved double reduction final drive gearbox constructed in accordance with the teachings of this disclosure, the improved gearbox containing spur gears having pockets and employing a plurality of wet brakes.

Referring now to FIG. 2, an improved final drive gearbox 100 may include a gearbox housing 106, and an input shaft 102 supported on an outboard bearing 104 affixed to and supported by a wall 107 of the housing 106. A corresponding inboard bearing 108, may also be supported by the wall 107 of the housing 106, may be adapted to support the inboard end of input shaft 102. An annular or sleeve styled input gear 110 having input gear teeth 112 may be positioned intermediately of the outboard and inboard bearings 104, 108.

It should be noted that the disclosed gearbox 100 may contain only pocket styled spur gears. The result may be a significant reduction in the physical number of gears required within the gearbox housing, to the extent that comparable reduction planetary gear sets each include a sun gear, a ring gear, and generally at least three planetary gears. By contrast, the disclosed embodiment of the double reduction spur gearbox may contain only four gears; two for enabling the first reduction, and two for enabling the second reduction.

The simplicity of the described gearbox 100 as compared to a planetary gearbox may be further appreciated as follows. Each set of gear teeth described herein may be circumferentially arranged about its respective gear, the interaction of each gear being only to mesh with the teeth of a radially adjacent mating gear, as herein described. By contrast, a planetary gear set incorporates a carrier that yokes the multiple planetary gears together to rotate as a slaved unit, the planetary gears generally being driven by the sun gear, which along with the planetary gears are all rotated within a fixed ring gear. The torque loads imposed by a planetary carrier on the various planetary gear teeth may be considerable, and can impose deleterious forces that tend to reduce gear teeth life. Such torque loads may be substantially reduced through the use of the spur gear structures disclosed herein.

The input gear teeth 112 are in constant mesh with mating teeth 114 of a first reduction gear 116, which may incorporate a hub 118 that rotates about an idler shaft 120. A second reduction gear 122, also displayed herein as a sleeve gear, may extend axially from the hub 118. The first and second reduction gears 116, 122 may be supported by bearings 124 and 126 through which the idler shaft 120 may extend. The first and second reduction gears, 116, 122, along with the shaft 120, together comprise a reduction gear system 115.

Although depicted here as sleeve gears, the input gear 110 and the second reduction gear 122 may alternatively be formed as integral parts of the input and idler shafts 102, 120, respectively; i.e. the gear teeth 112, 128 may be formed by gear machining operations performed on exterior surfaces of the respective shafts.

An output gear 132 contains teeth 130 which mesh with teeth 128 of the second reduction gear 122. The output gear 132 is secured to a final drive output shaft 134, variously referred to also as a low speed and/or high torque shaft. Conversely, the input shaft 102 is variously referred to as the high speed and/or low torque shaft. Through the double reduction gear system described, a significant speed reduction may be achieved between the input gear 110 and the output gear 132. For example, utilizing a pair of 5:1 ratio reductions, the output gear 132 may be made to rotate at one twenty-fifth the speed of the input gear 110. Commensurately, the torque produced by the output gear 132 would be substantially higher than the torque measured at gear 110. Although the example provided herein is a 5:1 ratio reduction, other reductions such as 3:1 or 4:1 could be useful in certain settings.

In the disclosed embodiment, the input and output shafts 102, 134 may be aligned along and thus share a common axis "a-a" as shown. This feature, along with the aspect that the idler shaft 120 and the gears 116, 122 fixed thereon are situated along an axis "b-b" that is parallel to the axis "a-a", may provide advantages related to the manufacturing of the gearbox 100.

The output shaft 134 may be supported by the inner race of a single bearing 136. The outer race of the bearing 136 may be secured to an interior wall 107 of the gearbox housing 106, as shown. Finally, the driving wheels of a machine (neither shown) may be affixed to the shaft 134 for high torque rotation thereof.

As disclosed, the gearbox 100 may contain a total of four gears designed and arranged in dual reduction stages, each stage adapted to produce an identical reduction, e.g. 5:1, to that available through a set of planetary gears. The gearbox 100 may thus afford a significant savings in the number of gear parts over the combination planetary and spur gear structure of the prior art such as Strehler et al. The latter would typically employ up to seven separate gear structures to achieve the identical amount of speed reduction.

It may be particularly noted that the first reduction gear 116 and the output gear 132 are of a type described herein as pocket gears. The pocket gears may be machined to have at least one annular pocket 150 on one side of the gear 116, and at least one pocket 160 on one side of gear 132. The pockets 150, 160 may be physically described as concave rings situated symmetrically about the rotational axis of the gear; the gear sidewalls 152, 154 defining bottoms of opposed concave rings. With respect to gear 116, the sidewalls 152, 154 may extend radially from the gear hub 118 to the inside rim or backside 156 of the laterally wider gear tooth ring body 158. The pocket 150 may be situated on one side, or alternatively the use of dual opposed pockets 150, 150', defined in part by sidewalls 152, 154, may be situated on respective sides (left and right, as shown in this described preferred embodiment) of the first reduction gear 116.

Correspondingly similar pocket structures 160 may be situated on, and be similarly described with respect to, the output gear 132. As defined, the pockets 150 and 160 may provide openings for piston actuated hydraulic wet brake packs 180, shown and described in detail for only the right side pocket 150'; i.e., the pocket having its bottom defined by the right gear sidewall 154 of the gear 116. Two wet brake packs may be utilized in the pockets 150, 160 of the presently described embodiment, although up to four such wet brake packs 180, 180' may be employed in the available pocket space. Each wet brake pack 180, 180' may have a set of rotatable brake discs 182 interleaved with fixed brake discs 184. The rotatable brake discs 182 may be splined to move along axially extending splines (not shown) in the backside 156 of the gear tooth ring body 158 of the first reduction gear 116. The discs 184 may be fixed with respect to the housing 106, and move along splines (not shown) contained on a brake reaction ring 185 (shown only at the brake pack 180') secured to the housing wall 107.

The interleaved inner and outer wet brake discs 182, 184 are analogous to the aforedescribed inner and outer prior art brake discs 31 and 30, respectively. In same manner, the discs 182 and 184 may be splined for axial movement, and forced together by a hydraulic piston 186, the gear sidewall 154 providing a braking reaction plate. Alternatively, a separate reaction plate (not shown) may be installed against the gear sidewall 154 without compromising space requirements. For example, such a reaction plate may be constructed of a thin hardened metal plate, interposed between the sidewall 154 and the wet brake pack 180.

It will be noted that a hub 170 may be provided on the output gear 132, the hub being adapted for rotation of the gear on the bearing 136, analogously to the hub 118 of the first reduction gear 116. However, the hub 170 may be designed differently as shown to receive the bearing 136 axially therein. The outer race of the bearing 136 may be secured to the interior of the hub 170 for rotation therewith, and the left end 103 of the shaft 102 may be piloted within the inner race of the bearing 136 to provide additional support. The pockets 150, 160 may provide means for accommodation of a plurality of brake packs, only two of which are depicted in the disclosed embodiment of FIG. 2. Additional brake packs 180 may be accommodated within the various pockets 160, 180 without requiring expansion or increase in size of the housing 106, as may become appreciated by those skilled in the art. Among other advantages, such use of multiple brake packs may be effective to reduce brake change cycle times, as braking loads may now be carried by multiple brake packs instead of by a single or unitary brake pack.

INDUSTRIAL APPLICABILITY

The technology disclosed herein may have industrial applicability in a variety of settings such as, but not limited to, enhancing braking capacity of final drives. As an improvement over typical planetary gear sets employed in double reduction gearboxes, the use of spur gears may be effective to reduce the required number of gears from ten to four. In addition, the use of spur gears for first reduction and output gears, with each gear having at least one concave pocket, may provide for the economical utilization of a plurality of sets of wet disc brakes within a gearbox without requirement of additional gearbox housing volume to contain the brakes.

A double reduction gearbox constructed in accordance with the teachings of the above disclosure may thus more economically provide final drive gear reductions with significantly reduced numbers of gear parts. The initial gear reduction may be provided by a simple input gear in mesh with a first reduction gear including at least one wet disc brake pack in at least one pocket thereof. A plurality of such pocket accommodated wet brakes may be employed to substantially reduce overall brake wear rates, enhance longevity of the brakes, and otherwise offer greater braking capacities over gearboxes containing planetary gear sets.

The input and first reduction gears may be arranged on radially spaced parallel shafts in a very simple construction mode as compared to commonly used planetary gear sets. The second reduction gear may share the same shaft with the first reduction gear, but mesh with the output gear. Moreover, the input gear and the output gears may share the same axis.

As disclosed, the use of spur gears having such pockets may provide an opportunity for utilization of at least two or more sets of wet disc brakes within a final drive gearbox, to otherwise enhance longevity of the brakes and/or to provide an improved braking capacity over that afforded by comparable double reduction gearboxes containing planetary gear sets. Such an improved gearbox might be advantageously utilized in a work machine, track-type tractor, road grader, truck, pipe layer, roller, forestry machine or other type of industrial machine useful in construction, mining, or agriculture.

In summary, the disclosed spur gear final drive gearbox may offer a) use of only spur gears to substantially reduce the overall number of gears while providing same reduction as a planetary gearbox, and 2) use of a plurality of brake packs within the gearbox without requiring a larger gearbox.

A method of manufacturing the improved final drive gearbox disclosed herein may include the following steps:

a) forming a housing having two pairs of axially opposed openings, each pair of openings defining a first axis and a second axis, each axis parallel and radially spaced apart from the other;

b) providing and installing bearings within said housing, each bearing symmetrically positioned along each axis at one of said openings and adapted to support one end of a pair of parallel shafts, each shaft extending along one of said axes and between each pair of openings;

c) installing an input gear on an input shaft, and inserting said input gear and input shaft through one of said pair of openings;

d) forming an output gear as a spur gear having annular axially opposed pockets on each side thereof; installing said output gear on an output shaft and inserting said output gear and output shaft through the opposed other of said one of said pair of openings in a manner such that said input and said output shafts are axially aligned along said first axis;

e) forming a gear reduction system by forming first and second reduction gears, said first reduction gear also formed as a spur gear having annular axially opposed pockets on each side thereof;

f) forming an idler shaft adapted to carry and support said first and second reduction gears;

g) fixing said first and second reduction gears to said idler shaft;

h) inserting said idler shaft along said second axis through said second pair of openings, such that said idler shaft is supported by respective bearings associated with said openings, said input and first reduction gears mesh with one another, and said second reduction and output gears mesh with one another; and i) inserting at least two wet brake packs within said pockets, only one brake pack being contained within each one of said pockets.

Lastly, the method steps may also include the step of forming each of said first and second gear reductions to be a 5:1 reduction ratio reduction, for example. In addition, the method steps may also include the steps of a) supporting said output shaft by a single bearing in said housing, and b) piloting the left end of said input shaft within said single bearing.

What is claimed is:

1. A final drive gearbox comprising a housing, an input gear and an output gear, each rotatably supported on respective input and output shafts within said housing, a reduction gear system and interposed between said input and said output gears, whereby said input and output gears respectively rotate at first and second speeds, wherein said second speed is lower than said first speed; said reduction gear system and said output gear comprising spur gears containing a plurality of annular pockets, each of said annular pockets having a bottom defined by a sidewall of one of said spur gears, wherein said annular pockets contain at least two wet brake packs, with only one wet brake pack being contained within each one of said annular pockets.

2. The gearbox of claim 1 wherein said reduction gear system comprises a double reduction of gear ratios from said input gear to said output gear.

3. The gearbox of claim 2 wherein said reduction gear system comprises first and second reduction gears in mesh respectively with said input and output gears; and wherein each of said first reduction and output gears comprise spur gears with at least two axially opposed annular pockets.

4. The gearbox of claim 3 wherein each of said gear reductions comprises a 5:1 reduction ratio.

5. The gearbox of claim 4 wherein said input shaft is supported on at least two bearings, and wherein said reduction gear system comprises at least two bearings, each of said bearings being supported within a housing wall.

6. The gearbox of claim 5 wherein said input shaft and said output shaft are aligned along a common axis, and wherein said output shaft is supported by a single bearing, said bearing supported by the housing wall, wherein the left end of said input shaft is piloted in said single bearing.

7. The gearbox of claim 6 wherein each side of said first reduction and output gears comprises one of said annular pockets, wherein each of said gears defines two pockets for accommodation of a wet disc brake pack, and wherein up to four of said brake packs may be installed within said housing of said gearbox.

8. The gearbox of claim 7 wherein said brake packs are hydraulically actuated.

9. The gearbox of claim 8 wherein said brake packs react against the bottom of the pockets whenever said brakes are actuated.

10. The gearbox of claim 8 wherein said brake packs react against a reaction plate interposed between the bottom of the pocket and the brake pack whenever brakes are actuated.

11. A final drive gearbox comprising a housing, an input gear and an output gear, each rotatably supported on respective input and output shafts sharing a common axis within said housing, a gear reduction system interposed between said input and said output gears, whereby said input and output gears respectively rotate at first and second speeds, wherein said second speed is lower than said first speed; said gear reduction system comprising an idler shaft containing a first reduction gear and a second reduction gear aligned on a second common axis; said first reduction gear and said output gear comprising spur gears having annular pockets, wherein said pockets comprise at least two wet brake packs, with only one brake pack being contained in each one of said pockets.

12. The final drive gearbox of claim 11 wherein said first and second reduction gears are in mesh with said input and output gears respectively; and wherein each of said first reduction and output gears comprise spur gears containing at least two axially opposed annular pockets.

13. The gearbox of claim 12 wherein said input shaft is supported on at least two bearings, and said first and second reduction gears are supported on an idler shaft, wherein said idler shaft is supported on at least two bearings, wherein each of said bearings is supported within a housing wall.

14. The gearbox of claim 13 wherein said first axis and said second axis are parallel, and wherein each side of said first reduction and output gears comprises one of said pockets, and wherein each of said gears defines two axially opposed pockets, each pocket adapted to accommodate a wet disc brake pack, wherein a brake pack is contained within at least one of each pocket of said first reduction gear and said output gear.

* * * * *